United States Patent [19]

Cortner

[11] Patent Number: 4,472,205

[45] Date of Patent: Sep. 18, 1984

[54] METHOD FOR CLEANING VARIOUS SURFACES OF A SINGLE ARTICLE

[76] Inventor: Jay C. Cortner, 600 SE. Marion St., No. 503, Portland, Oreg. 97202

[21] Appl. No.: 481,246

[22] Filed: Apr. 1, 1983

[51] Int. Cl.$^3$ ................................................ B08B 7/04
[52] U.S. Cl. ........................................ 134/27; 134/28; 134/29
[58] Field of Search .............................. 134/27, 28, 29

[56] References Cited

U.S. PATENT DOCUMENTS

| | | | |
|---|---|---|---|
| 307,190 | 10/1884 | Green | 134/28 X |
| 2,359,088 | 9/1944 | Croft | 134/28 X |
| 2,801,941 | 8/1957 | Johnson | 134/27 |
| 4,002,489 | 1/1977 | Hedqvist et al. | 134/28 |

FOREIGN PATENT DOCUMENTS

| | | | |
|---|---|---|---|
| 51-41639 | 4/1976 | Japan | 134/28 |

*Primary Examiner*—Marc L. Caroff
*Attorney, Agent, or Firm*—Richards, Harris & Medlock

[57] ABSTRACT

A first high concentration acidic solution is applied over a dry and generally highly contaminated surface. A second less concentrated acidic solution is applied to at least the remaining surfaces. The second acidic solution concentrations are selected to leave protective coatings, such as wax, intact on the cleaned surface. The first and second acidic solutions are rinsed from the surfaces with alkaline solutions.

16 Claims, No Drawings

METHOD FOR CLEANING VARIOUS SURFACES OF A SINGLE ARTICLE

BACKGROUND OF INVENTION

This invention relates to methods for industrial cleaning and, more particularly, to chemical methods and solutions for removing surface contaminants from industrial apparatus and transportation devices, such as automobiles, trucks, and the like.

Washing systems are generally of two types: abrasive (brushes) and chemical (without brushes). The more common system utilizes brushes or other scrubbing devices which operate against the surface of a device to remove surface contaminants. While the brush-type is effective in removing surface dirt, the mechanical agitation of brushes may produce deleterious abrasion of a painted surface. In addition, such brush-type systems can damage accessory equipment such as mirrors, antennas, decorative trim, or other appurtenances.

In a brushless operation, chemical action and agitation from high pressure streams or jets of various solutions are directed against the surface to be cleaned. Early systems used alkaline detergent solutions as the sole cleaning solution. However, such high pressure solutions were not entirely effective to remove the adherent film of contaminants present on most devices, particularly vehicles. On transportation devices this contamination is particularly evident as an adherent film on ferrous or non-ferrous surfaces as bumpers and wheel rims. Such adherent road film may contain materials originating from soils, exhaust emissions, tire wear, cement, rust and road salt.

A second procedure was devised to remove the adherent road film, still without agitation. Particular procedures were developed to use a combination of acid and alkali detergent solutions in sequence. However, the corrosive attack of the effective solutions on glass, aluminum, magnesium and ferrous components has precluded any widespread adoption and use of the basic procedure.

Yet a further approach to a brushless washing procedure includes acidic formulations containing a detergent builder, preferrably selected from the alkali metal phospates or bisulfates, and a fluoride compound. The device to be cleaned was first wholly wetted with a jet of used or reclaimed acid solution having a pH in the range of 4.5–5.0 at a pressure effective to mechanically remove major surface contamination; then contacted with a jet of first fresh acid solution having a pH of 4.5–5.0 and generally without a fluoride compound; and finally, contacted with a heated mist of a second fresh acid solution including fluoride compounds. After the acid applications, the device was then rinsed with a jet of alkaline solution followed by a jet of water. Application of the solutions was from fixed nozzles and the acid solutions were formed with low concentrations of active ingredients to minimize costs.

The above procedure generally removed light adherent film contamination without noticeable damage to aluminum, magnesium or other ferrous components, but strongly bound contamination, forming a tenaciously adherent road film comprised mainly of hydrocarbon-soil matrix, are not removed. If the concentration of active ingredients is increased to accomodate heavy contamination, substantial protective film removal from the surface is obtained even in a single cycle, and, although cleaning is improved, there still remains surface contamination. Also, the cost of the cleaning cycle substantially increases due to increased chemical usage.

In yet another attempt, a low concentration acid solution (about 1.5 weight percent active ingredients) is applied over an entire dry vehicle and rinsed with an alkaline solution. The cleaning capability of this process may be slightly improved over the above procedures, but the sensitivity of protective film removal to the applied ingredient concentrations was increased.

The disadvantages of the prior art are overcome by the present invention, however, and improved methods are provided for industrial cleaning in a brushless, or chemical, system.

SUMMARY OF INVENTION

A chemical cleaning method for contaminated articles is provided without recourse to mechanical brushes and the like. The concentrations of active ingredients adjacent the contaminated surface are effected by controlling composition of the projected solution and dilution of the solution on the surface. A first relatively concentrated acidic solution is projected toward the most contaminated surface while the surface is dry. A second less concentrated acidic solution is then projected toward remaining contaminated surfaces. An alkaline solution is projected toward all the surfaces with sufficient force to remove the contamination loosened by the acidic sprays.

A concentrated acidic cleaning solution is also presented. The solution includes fluorides, detergent builders and surfactants in concentrations effective to loosen adherent contamination from surfaces to be cleaned, while protecting aluminum and ferrous metallic surfaces from the fluorides and buffering the solution to maintain low pH.

It is a feature of the present invention to provide matching of solution ingredient concentrations and area of application with desired cleaning capability.

Another feature for vehicle application is to provide enhanced cleaning for low vertical surfaces where highly contaminated surfaces may obtain.

One other feature is to provide improved uniformity of coverage by placing spray apparatus at preselected distance from the article being cleaned.

Yet another feature for vehicle application is minimum removal of protective films, such as wax, on vulnerable, generally horizontal, surfaces.

DETAILED DESCRIPTION

The basic process, hereinbelow described in detail, comprises generally the following steps:

1. Application to a dry surface of a first fresh acid solution, including relatively high concentrations of a fluoride compound and alkali metal phosphates or bisulfates, the application being limited in scope to generally low vertical surfaces and in velocity to just reach the subject surfaces;

2. An optional, but preferrable, alkaline rinse of reclaimed or fresh solution;

3. A second fresh acid solution of relatively low concentrations of first solution active ingredients, generally applied as a mist over the entire surface;

4. A rinse of reclaimed or fresh alkaline solution; and

5. A final spray rinse of plain water.

Each of the solution applications is preferably made at a predetermined distance from the surface being cleaned to maintain uniformity of application.

Thus, the improved procedure provides control over the concentration of acidic solution applied for removal of heavy and/or difficult contaminates. Although the general process discussed herein has applicability to many industrial cleaning situations, and such applications are specifically contemplated, one particularly large application is in cleaning transportation devices, e.g. car washes. The following description sets forth one embodiment of the present invention as a car wash but no limitation is intended thereby.

The apparatus used to practice the present process is comprised of conventional components for car wash systems. Brush-type locating systems for wheels may be used to position the various spray stalks at predetermined distances from a vehicle during traverse of the spray stalks. A first spray stalk to project the first fresh acid has a spray effective to wet generally the bottom vertical areas around the car, including the front and rear decorative areas. Nozzles mounted on the stalk form a spray covering the selected area. A second stalk may project a conditioned relaim or fresh alkaline solution to rinse the first acid solution from the vehicle. Preferably the second stalk nozzles rinse substantially the surface covered by the first acid, leaving the remaining surfaces generally dry. The first and second stalks are preferably associated with sensing and directing apparatus to spray solution toward the fore and aft vehicle vertical surfaces for thorough coverage.

A third spray stalk is positioned to project a second fresh acid solution, generally as a mist, over the entire vehicle. The mist and the solution ingredient concentrations are selected to remove the remaining light and conventional surface contaminants without stripping protective film, particularly from horizontal surfaces most vulnerable to deposition and attack by airborne contaminants, ultraviolet irradiation, and the like. A fourth spray stalk projects a second spray of conditioned reclaim or fresh alkaline solution over the surface covered by the second acid solution. A water rinse and dryer device complete the apparatus.

A preferred spray pattern includes the following for each vehicle side:

Cycle 1 (High Concentration Acid)—Two 6502 (65° vertical divergence with 0.2 gallons/minute delivery at 40 psi) plastic tip nozzles located to cover only vertical vehicle surfaces;

Cycle 2 (Reclaim, alkaline)—Four 8070 stainless steel tip nozzles rinse general area covered in Cycle 1;

Cycle 3 (Low Concentration Acid)—Two 8002 plastic tip nozzles directed particularly to cover vehicle area not covered in Cycle 1;

Cycle 4 (Fresh Alkaline Rinse)—Four to six 8006 to 4006 stainless steel tip nozzles to rinse generally the entire vehicle. In all four cycles, it is desirable that sensing apparatus turn the nozzles toward an approaching vehicle, move the nozzles to substantially perpendicular toward the passing vehicle and finally toward the rear surface of a departing vehicle.

PREFERRED EMBODIMENT

A dry vehicle is initially contacted with a first fresh acid solution. This solution is projected over the lower vertical portion of the vehicle, generally confined to a location below from about the top portion of the wheel well and including the bumpers and lower rocker panel area, or an area to about 20–26 inches above the ground. The solution is applied to the vehicle surface in the form of a spray. Chemical activity from this acid solution serves to release bonds holding contamination on the surface.

The first acid solution is generally projected from a distance of about 10–12 inches through nozzles having a spray angle in the range of 50° to 95° to confine spray coverage to the selected lower area. The distance of the nozzles from the vehicle surface is functionally related to the number and spray cone divergence of the nozzles. For example, one nozzle would require 95° divergence at 10 inch separation and 85° at 12 inches for suitable coverage of the lower vehicle zone. Likewise, two nozzles may be used with 50° divergence at 12 inches and 55°–65° at 10 inches to cover the selected area.

The first acid solution may now be highly concentrated to remove the substantial contaminants from the confined lower surface area. A suitable solution has a pH range of about 4.0 to 7.0 and preferably 4.5 to 5.0 is used with concentration of active fluorine in the range 0.2 to 0.8 weight % and phosphorus in the range 0.2 to 0.8 weight % (weight % is referenced to the projected solution). A flow rate of 0.5 to 4.0 gpm, and preferably about 1.5 gpm, is projected with a pressure in the range 50 to 200 psi, and preferably about 150 psi.

Immediately following the application of a first acid solution an alkaline solution may be projected through jets against the vehicle surface. The alkaline solution may be a reclaimed solution, generally amalgamated from the various chemical solutions that are in the total wash cycle. This solution preferably does not contain the final rinse cycle waters or any wax or drying agent cycle chemicals. A reclaimed solution is preferably adjusted to be alkaline, i.e. having a pH greater than 7.0 and less than about 12.3. Such reclaimed solution is projected toward the vehicle surface at a pressure in the range of 100 to 300 psi and preferably about 165 psi. The reclaimed solution may be applied at a temperature in the range from ambient to about 60° C. and at a rate in the range of 100 to 250 gpm, and preferably at about 150 gpm.

Each application nozzle generally handles a flow rate in the range of 10 to 25 gpm and preferably about 15 gpm. This range of spray nozzle flow rates and pressures provides force to the alkaline spray jet needed to remove the surface contamination film present on heavily soiled vehicles and loosened by the acid spray.

Alternatively, adequate force may also be obtained by a high pressure and low volume alkaline solution. Then the alkaline solution remains in the above temperature range and is applied at a rate in the range of 10 to 30 gpm and preferably about 20 gpm. Each nozzle is now selected to have a flow rate generally in the range of 2 to 4 gpm and preferably 2.5 to 3.0 gpm. Solution application to the vehicle surface is preferably with a pressure in the range of 400 to 1200 psi and preferably about 600 psi.

It should be noted that a fresh alkaline solution may be used in lieu of a reclaimed solution. Application parameters remain the same as with the reclaimed solution. Following these two solution applications (first fresh acid and second alkaline solution) the lower portion of the vehicle contacted by the solutions is now relatively clean.

After the first fresh acid mist, and preferably after an alkaline spray, the remaining surfaces of the vehicle are contacted with a second acid solution which is less concentrated than the first acid solution. The second acid solution is projected to form a mist. Projected solution may settle on all surfaces of the vehicle to loosen or release bonds holding the contamination to the surface of the vehicle. The concentration of active ingredients in the second acid solution is more conventional with fluorine in the range of 0.005 to 0.2 weight % and phophorus in the range of 0.1 to 0.33 weight %.

The second acid solution generally provides a pH in the range of 4.0 to 7.0, and preferrably 4.5 to 5.0, and is projected at a pressure in the range of 50 to 200 psi, and preferrably about 150 psi, at a temperature from ambient to about 60° C. and preferrably about 50° C., and at a rate in the range of 0.5 to 4.0 gpm and preferrably about 1.5 gpm.

After this second acid solution, which serves to release bonds holding contamination to the vehicle surface, a second alkaline solution is projected in jets against the surface of the vehicle. The second alkaline solution again provides the mechanical force to remove contaminants, both particulate and film, to obtain the cleaned surface which is desired. Application parameters for the second alkaline solution are generally the same as for the first alkaline solution, hereinabove described. The preferred solution for the second alkaline solution is a fresh solution with controlled concentrations, although a reclaimed solution may be used.

The mechanisms by which soils are attached to the surfaces of an automobile are not fully understood, but are believed to be dependent on the physical and chemical characteristics of both the contaminants and the surface on which the contaminant is held. Some surface characteristics include chemical composition, porosity, wettability and chemical reactivity with contaminants. Contaminant characteristics which may determine how the soil is bound include particle size, surface tension and wetting power (liquid soils), solubility of solid soil in liquid soil, and chemical reactivity with the soiled surface. Contaminants may be attached by mechanical entrapment in surface irregularities, by bonding to the surface from cohesive or wetting forces, or bonding from chemical or adsorptional combination with the surface.

The loss or weakening of the bonds holding contaminants with the surface to be cleaned permits a high volume reclaimed solution spray or high pressure alkaline solution spray to remove the contaminants and deterging solution holding the contaminants by mechanical action of the spray impacting the surface. Without sufficient concentration of active ingredients in the first fresh acid spray, this deterging solution does not obtain adequate ions and surfactant molecules to effect separation and to hold contaminants found bonded to highly contaminated surfaces. Commonly encountered traffic contaminants found on vehicles which are washed regularly and have a good finish with non-oxidized paint do not generally constitute highly bound soils and may be removed by the application of less concentrated acid spray followed by a high volume or high pressure spray rinse.

It will be appreciated that the concentration of active ingredients acting to loosen contaminants for removal is greatly affected by liquid on the vehicle surface. Thus, in the present case, the first acid solution is projected onto a substantially dry surface. Since the first acid solution is a highly active solution with increased concentrations of active ingredients, application is limited generally to lower vertical surfaces of the vehicle. Further, the rinse material application may preferrably be limited to the area of the acid spray.

The second acid solution may now also be applied directly to a generally unwetted area, the active ingredient concentrations being substantially lower in the second acid solution than the first acid solution. In this manner, it is believed that ingredient concentrations may be more uniformly optimized.

The distribution of active ingredients on a contaminated surface is also affected by the relative distance between spray application nozzles and the surface. With fixed nozzles, the distance may vary from side-to-side and from vehicle-to-vehicle. As herein preferred, the distance is constant as conventional apparatus positions the spray nozzles at a predetermined distance from the surface. In this manner, solution concentration and surface application are capable of control.

As hereinafter described, three ranges of ingredient concentrations are provided. A first, widest range represents an operable range; a second, more narrow range represents a more effective range of concentration. Finally, a third, narrow range or a particular concentration is provided. The third range was determined from test washing vehicles representative of New Mexico road conditions believed to represent severe contamination, but additional optimization within the first or second ranges may be required for other contamination conditions.

A first fresh acid spray for removing highly bound contaminants typically found on lower vertical vehicle surfaces includes an aqueous solution of detergent builders, fluorides, surfactants, and organic solvents in higher concentrations than heretofore believed to be used. The first fresh acid solution generally contains selected amounts of active ingredients, as hereinafter defined, with the balance being preferably softened water (less than 1 grain hardness). Of the active ingredients, the composition includes from 0.2 to 0.8 weight % phosphorus or equivalent, more effectively in the range of 0.23 to 0.54 weight %, and preferrably about 0.26 to 0.36 weight %; 0.2 to 0.8 weight % of fluorine or equivalent, more effectively in the range of 0.27 to 0.67 weight %, and preferrably about 0.3 to 0.5 weight %; 0.7 to 2.0 of surfactants, more effectively in the range of 0.8 to 1.5 weight % and preferrably about 0.9 to 1.1 weight %; and 0.1 to 0.6 weight % or organic solvents, more effectively in the range of 0.2 to 0.5 weight %, and more preferrably about 0.3 to 0.4 weight %.

Detergent builders preferably take the form of alkali metal orthophosphates and complex phosphates, such as monosodium phosphate, sodium acid pyrophosphate and the like; or alkali metal bisulfates or nitrates, such as sodium or potassium bisulfate or sodium or potassium nitrate. The function of these detergent builders is to act as penetrating and wetting agents, emulsifiers, buffers, etc. In high concentrations the phosphates, sulfates and nitrates serve to protect aluminum, magnesium and other ferrous surfaces from attack by fluorides while maintaining efficacy of the fluorides to loosen or remove bound contaminants. As used herein, the weight percent equivalents may be derived to yield the weight percent phosphorus in the desired range. Bisulfates and nitrates equivalent are identical to the actual derived weight for sodium phosphate monobasic (anhydrous).

The surfactants may typically include conventional compounds, like cationic, anionic, non-ionic and amphoteric types. The specific surfactants in the fresh acid solution are functionally selected on a number of factors, including the properties of the water used and the nature of the contamination typically encountered at the location of the washing system. Examples of suitable surfactants include ethoxylated fatty amines, ethoxylated alkylphenols, phosphate esters, amphoteric imidazoline derivatives, ethoxylated fatty acids, ethoxylated alcohols, ethoxylated triglycerides, alkyl aryl sulfonates, fatty acid alkyloamides, amine salts of linear alkylbenzenesulfonates, alkyl polyethoxyethanols, alkyl ethers, and the like. Surfactants have different surface tension effects and solubilities for grease and other oily contaminants, wherein a combination of surfactants may be selected for the acid solution formulations.

Organic solvents are included in the first fresh acid solution to further assist in dissolving various oily contaminants, since detergent builders and surfactants with surface activity alone may not be powerful enough to loosen contaminants fixed to the surface by the attraction of oily or resinous matter. Suitable organic solvents include the various glycol ethers, isopropanol, dimethyformamide, diisobutylene, kerosene, V. M. and P. napthas, mineral spirits, aromatic solvents (e.g. xylene, benzene, toluene) and the like. It should be noted that water may also serve as a solvent for some contaminants.

Fluoride compounds may be selected from ammonium fluoride (more specifically ammonium bifluoride), or an alkali metal fluoride, such as potassium or sodium fluoride. Fluorine acts as an activator for loosening or releasing the bonds that hold contaminants to the surface to be cleaned. As used herein, weight percent equivalents may be derived for a selected fluoride compound to yield the weight percent fluorine in the desired range.

The second fresh acid solution generally contains active ingredients in softened water. Of the active ingredients, the composition includes from 0.1 to 0.33 of phosphorus or equivalent, more effectively in the range of 0.2 to 0.3 weight %, and preferably about 0.25 weight %; from 0.005 to 0.2 weight % fluorine or equivalent, more effectively in the range of 0.07 to 0.2 weight %, and preferably 0.10 to 0.13 weight %; 0.2 to 0.7 weight % of surfactants, more effectively 0.4 to 0.6 weight %, and preferably about 0.5 weight %; from 0.03 to 0.2 weight % of organic solvents, more effectively 0.1 to 0.2 weight %, and preferably about 0.1 weight %.

The active ingredients perform as, and are selected from, the ingredients hereinabove discussed for the first fresh acid spray. However, the concentrations for fluorine and phosphorus are selected to be less than the corresponding concentrations in the first acid spray. More particularly, the concentrations are selected to be generally ineffective in removing wax from vehicle surfaces exposed to a second fresh acid spray. Again, the specific weight of compounds forming the solutions are derived based on actual chemical formula to yield the desired weight % of fluorine and phosphorus.

Fresh alkaline spray solution which may form either alkaline spray contains from 0.10 to 0.25 weight % of active ingredients, and preferably about 0.18 weight % in an aqueous solution, preferably with softened water. The active ingredients include 0.08 to 0.20 weight % of detergent builders, preferably about 0.15 weight %; 0.01 to 0.02 weight % surfactants, and preferably about 0.015 weight %; and 0.01 to 0.03 weight % of organic solvents, and preferably about 0.01 weight %.

The detergent builders may be selected from orthophosphates (e.g. disodium or dipotassium phosphate, trisodium or tripotassium phosphates), complex phosphates, (e.g. tetrasodium or tetrapotassium pyrophosphate or sodium tripolyphosphate); sodium silicates (e.g. sodium orthosilicate, sodium metasilicate or sodium sesquisilicate); carbonates (e.g. sodium carbonate or sodium bicarbonate); hydroxides (e.g. sodium or potassium hydroxide); or sundry inorganic builders, such as sodium tetraborate or the like. Phosphate properties include alkalinity, rinsibility, emulsification, some buffering action, deflocculating properties and sequestering properties. Silicate properties include emulsification, active alkalinity, solid suspension and excellent buffering with pH greater than 9. Carbonates are generally used when a low cost alkaline spray is warranted, but carbonate properties do include water softening and buffering. Hydroxides have very little detergent capability and are generally used as a low cost method to provide active alkalinity or to neutralize acidic solutions. Borates may be useful to provide water softening, deterging and good buffering effects where low alkaline pH (less than about pH 9.5) is desired.

Surfactants utilized in the fresh alkaline spray solution may include the same surfactants used in conjunction with the first and second fresh acid spray solution. Here again, a combination of surfactants is preferred to obtain the desired blend of surface tension and solubility effects to assist in complete removal of surface contaminants.

Solvents in the fresh alkaline spray solution may also include the same solvents hereinabove discussed for the fresh acid spray solutions to perform the same function. The fresh alkaline, or acid, spray solution may also contain up to 5 weight %, based on active ingredients, of chelating agents, such nitrilo triacetic acid, ethylene diamine tetraacetic acid, or gluconic acid (or any of the neutralized salts of these acids).

In specific example, vehicles are conveyed along a series of stalks or arches, each containing a plurality of spray nozzles. A first series of spray nozzles delivers a first fresh acid solution. This first fresh acid solution is preferably at ambient temperature, a pH of about 4.5, a pressure of 100 psig, and a volume of 1.28 gpm. This solution serves to activate the release of various bonds that hold the contamination to the lower, generally vertical, surfaces of the vehicle. A suitable first fresh acid solution has the following formulation in weight percent:

| | |
|---|---|
| Sodium phosphate monobasic (anhydrous) | 0.30 |
| Sodium phosphate dibasic (anhydrous) | 0.90 |
| Ethoxylated fatty amine (Trymeen RTAM-15 POE (15) Tallow Amine) | 0.18 |
| Ethylene glycol monobutyl ether (VWR Glycol Ether GB) | 0.23 |
| Ethoxylated Alkyl Phenol (Trycol RNP-1 POE (a) Nonyl Phenol) | 0.29 |
| Di-sodium salt of a dicarboxylated imidazoline derivative (Miranol RC2M-SF CONC) | 0.29 |
| Phosphate Ester (Tryfac ® 610-K Phosphate Ester) | 0.58 |
| Alcohol (VWR Isopropyl Alcohol) | 0.059 |
| Aromatic Solvent (VWR Xylol) | 0.059 |
| Amine salt of linear alkylbenzene sulfonate (Trylon ® R 3300 Anionic) | 0.05 |
| Ammonium bifluoride | 0.67 |
| Water | 96.41 |

Immediately following application of first fresh acid solution, the vehicle may be contacted with a reclaimed rinse solution. This solution does not necessarily exclude the rinsing and waxing cycle solutions and is periodically conditioned by the addition of caustic soda to obtain a pH generally in the range pH 8–11. This reclaimed solution is projected at ambient temperature, at a pump pressure of 165 psig, with a volume rate of 14 gpm per nozzle for a total flow rate of 112 gpm. The force generated by this high volume reclaim solution impinging against the surface of the vehicle serves to remove substantially all the surface contaminants loosened and suspended about the vehicle surface by the first acid solution. The first rinse solution is preferrably directed over the area covered by the first acid solution, leaving the remaining surface substantially dry.

A second fresh acid spray solution is then applied to the vehicle through a third series of spray nozzles located about 8 feet downstream of the reclaimed solution spray. The second fresh acid spray solution preferrably has a pH of about 4.5, projected at a pump pressure of 100 psig and a flow rate of about 1.28 gpm, and at a temperature in the flow lines of about 32° C. This solution is applied to the vehicle surface, and may include the entire surface, in the form of a heated mist and serves to loosen the bonds that hold conventional contaminants to the surface of the vehicle over the areas not contacted by the first fresh acid spray and further acts to reclean the surfaces wet by the first fresh acid and rinse.

A suitable second fresh acid solution has the following formulation in weight percent (note that the preferred sources are the same as for the first acid spray formulation, unless otherwise indicated):

| | |
|---|---|
| Sodium phosphate, monobasic (anhydrous) | 0.90 |
| Sodium phosphate, dibasic (anhydrous) | 0.05 |
| Ammonium bifluoride | 0.12 |
| Ethoxylated Fatty Amine | 0.10 |
| Ethylene glycol mono-butyl ether | 0.05 |
| Ethoxylated Alkyl Phenol | 0.03 |
| Disodium salt of a dicarboxylated imidazoline derivative | 0.19 |
| Isopropanol | 0.05 |
| Amine salt of linear alkylbenzene-sulfonate | 0.08 |
| Water | 98.41 |

The vehicle is then passed through a spray wherein a fresh alkaline solution is directed through spray nozzles against the vehicle surface. The alkaline solution has a pH of about 10.5, delivered with a pump pressure of 600 psig at 18 gallons per minute and a temperature in the flow line of about 50° C. This high pressure alkaline solution also provides force to remove remaining surface contaminants and stubborn road film from at least the portion of the vehicle not contacted by the first fresh acid spray and reclaimed solution spray.

A suitable alkaline solution has the following formulation in weight percent (note the preferred sources are the same as noted for the acid spray ingredients unless otherwise noted):

| | |
|---|---|
| Sodium metasilicate (anhydrous) | 0.0565 |
| Sodium tripolyphosphate (anhydrous) | 0.1130 |
| Disodium salt of a dicarboxylated imidazoline derivative | 0.0075 |
| Ethylene glycol mono-butyl ether | 0.0038 |
| Ethoxylated Alkyl Phenol | 0.0019 |
| Alcohol | 0.0019 |

| -continued | |
|---|---|
| Phosphate Ester | 0.0019 |
| Amine salt of linear alkylbenzene-sulfonate | 0.0019 |
| Water | 99.8097 |

Following application of the alkaline solution the vehicle is passed through a multitude of clear water spray nozzles at a volume of 20 gpm to rinse the last alkaline solution from the surfaces. This rinse cycle may operate from city water pressure.

After the final rinse and drying cycles, the vehicle is clean. Residual contamination has been greatly reduced over other brushless systems. Further, damage to painted surfaces and to projections caused by rotating brushes is eliminated. Controlled solution concentration and area application minimize damage to aluminum and other ferrous metallic surfaces and minimize the removal of protective coatings from selected surfaces.

It is therefore apparent that the present invention is one well adapted to attain the improvements hereinabove set forth, together with other improvements and advantages which will become obvious and inherent from a description of the process itself. It will be understood that certain combinations and subcombinations of the process are of utility and may be employed without reference to other features and subcombinations for cleaning contaminated surfaces. This is contemplated by and is within the scope of the present invention.

As many possible embodiments may be made of this invention without departing from the spirit or scope thereof, it is understood that all matters hereinabove set forth are to be interpreted as illustrative and not in any limiting sense.

What is claimed is:

1. A chemical cleaning method for a contaminated article, comprising the steps of:
    projecting a first acidic solution have a first concentration of fluoride ions and detergent builders against only a first substantially dry surface of said contaminated article,
    projecting a second acidic solution having a second concentration of fluoride ions and detergent builders against a second surface of said contaminated article,
    said first concentration of fluoride ions and detergent builders being greater than said second concentration of fluoride ions and detergent builders, and
    impacting said first and second surfaces with an alkaline solution effective to remove contamination loosened by said first and second acidic solutions.

2. A method according to claim 1, wherein said detergent builders are selected from a group consisting of alkali metal phosphates, alkali metal bisulfates and alkali metal nitrates.

3. A method according to claim 1, wherein said concentration of fluoride is 0.2 to 0.8 weight percent equivalent fluorine and of said detergent builder is 0.2 to 0.8 weight percent equivalent phosphorus of said projected first acidic solution.

4. A method according to claim 3, wherein said concentration of fluoride is 0.27 to 0.67 weight percent equivalent fluorine and of said detergent builder is 0.23 to 0.54 weight percent equivalent phosphorus of said projected first acidic solution.

5. A method according to claim 1, further including the step of:

projecting said first acidic solution and said second acidic solution from respective predetermined distances from said article to be cleaned.

6. A method according to claim 1, further including the step of:
impacting generally said first surface with an alkaline solution effective to remove contamination loosened by said first acidic solution before projecting said second acidic solution.

7. A method according to claim 6, wherein:
said concentration of fluoride is 0.2 to 0.8 weight percent equivalent fluorine and of said detergent builder is 0.2 to 0.8 weight percent equivalent phosphorus of said first acidic solution, and
said concentration of fluoride is 0.005 to 0.2 weight percent equivalent fluorine and of said detergent builder is 0.1 to 0.33 weight percent equivalent phosphorus of said second acidic solution.

8. A method according to claim 7, wherein:
said concentration of fluoride is 0.27 to 0.67 weight percent equivalent fluorine and of said detergent builder is 0.23 to 0.54 weight percent equivalent phosphorus of said first acidic solution, and
said concentration of fluoride is 0.07 to 0.2 weight percent equivalent fluorine and of said detergent builder is 0.2 to 0.3 weight percent equivalent phosphorus of said second acidic solution.

9. A method according to claim 1, wherein said contaminated article is a vehicle and further includes the step of:
confining said first acidic solution substantially to vertical surfaces of said vehicle.

10. A method according to claim 9, wherein said second surface includes generally horizontal surfaces of said vehicle.

11. A method according to claim 10, wherein said detergent builders are selected froma group consisting of alkali metal phosphates, alkali metal bisulfates and alkali metal nitrates.

12. A method according to claim 11, wherein said concentration of fluoride is 0.2 to 0.8 weight percent equivalent fluorine and of said detergent builder is 0.2 to 0.8 weight percent equivalent phosphorus of said projected first acidic solution.

13. A method according to claim 12, wherein said concentration of fluoride is 0.27 to 0.67 weight percent equivalent fluorine and of said detergent builder is 0.23 to 0.54 weight percent equivalent phosphorus of said projected first acidic solution.

14. A method according to claim 11, wherein:
said concentration of fluoride is 0.2 to 0.8 weight percent equivalent fluorine and of said detergent builder is 0.2 to 0.8 weight percent equivalent phosphorus of said first acidic solution, and
said concentration of fluoride is 0.005 to 0.2 weight percent equivalent fluorine and of said detergent builder is 0.1 to 0.33 weight percent equivalent phosphorus of said second acidic solution.

15. A method according to claim 14, wherein:
said concentration of fluoride is 0.27 to 0.67 weight percent equivalent fluorine and of said detergent builder is 0.23 to 0.54 weight percent equivalent phosphorus of said first acidic solution, and
said concentration of fluoride is 0.07 to 0.2 weight percent equivalent fluorine and of said detergent builder is 0.2 to 0.3 weight percent equivalent phosphorus of said second acidic solution.

16. A method according to claim 14, further including the step of:
projecting said first acidic solution and said second acidic solutions from respective predetermined distances from said article to be cleaned.

* * * * *